United States Patent
Ohya et al.

(10) Patent No.: US 10,708,531 B2
(45) Date of Patent: Jul. 7, 2020

(54) PHOTOELECTRIC CONVERSION APPARATUS AND IMAGE PICKUP SYSTEM

(71) Applicant: CANON KABUSHIKI KAISHA, Tokyo (JP)

(72) Inventors: Takeru Ohya, Machida (JP); Tomoya Onishi, Ayase (JP); Daisuke Kobayashi, Kawaguchi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 3 days.

(21) Appl. No.: 16/439,500

(22) Filed: Jun. 12, 2019

(65) Prior Publication Data

US 2019/0297296 A1  Sep. 26, 2019

Related U.S. Application Data

(63) Continuation of application No. 15/136,757, filed on Apr. 22, 2016, now Pat. No. 10,362,251, which is a continuation of application No. 13/763,991, filed on Feb. 11, 2013, now Pat. No. 9,325,922.

(30) Foreign Application Priority Data

Feb. 17, 2012 (JP) .................................. 2012-033359

(51) Int. Cl.
H04N 5/3745 (2011.01)
H04N 5/378 (2011.01)

(52) U.S. Cl.
CPC ......... *H04N 5/37455* (2013.01); *H04N 5/378* (2013.01)

(58) Field of Classification Search
CPC ........................... H04N 5/37455; H04N 5/378
See application file for complete search history.

(56) References Cited

U.S. PATENT DOCUMENTS 5,461,425 A    10/1995  Fowler et al.
6,757,018 B1 *  6/2004  Fowler .................. H04N 5/378
                                                    348/301

FOREIGN PATENT DOCUMENTS

| JP | 2002-534005 A | 10/2002 |
| JP | 2006-203736 A | 8/2006 |
| JP | 2008-227800 A | 9/2008 |
| JP | 2009-159069 A | 7/2009 |

* cited by examiner

*Primary Examiner* — Twyler L Haskins
*Assistant Examiner* — Fayez Bhuiyan
(74) *Attorney, Agent, or Firm* — Canon U.S.A., Inc. IP Division

(57) ABSTRACT

Provided is a photoelectric conversion apparatus including a plurality of pixels and a control unit, wherein each of the pixels includes a photoelectric conversion unit and a digital-signal output unit configured to output a digital signal based on the output of the photoelectric conversion unit, and the number of bits of the digital signal may be switched.

65 Claims, 13 Drawing Sheets

PHOTOELECTRIC CONVERSION APPARATUS AND IMAGE PICKUP SYSTEM

CROSS REFERENCE TO RELATED APPLICATIONS

This application is a Continuation of U.S. application Ser. No. 15/136,757, filed Apr. 22, 2016; which is a Continuation of U.S. application Ser. No. 13/763,991, filed Feb. 11, 2013, now becomes U.S. Pat. No. 9,325,922, issued Apr. 26, 2016; which claims the benefit of Japanese Patent Application No. 2012-033359 filed Feb. 17, 2012, which are hereby incorporated by reference herein in their entireties.

BACKGROUND OF THE INVENTION

Field of the Invention

One disclosed aspect of the embodiments relates to a photoelectric conversion apparatus and an image pickup system, and in particular, to a photoelectric conversion apparatus and an image pickup system in which the pixels each have an analog-to-digital conversion unit.

Description of the Related Art

An image sensor having a configuration in which each pixel includes means for analog-to-digital conversion (hereinafter referred to as AD conversion) is disclosed in Japanese Patent Laid-Open No. 2006-203736. With this configuration, an operation from exposure of the sensor to AD conversion of a signal can be performed together by all the pixels.

However, assuming that the resolution of AD conversion is N-bit (N is a natural number), N signals need to be always read out from the individual pixels, and thus, the frame rate is controlled. This makes it difficult to increase the frame rate.

One disclosed aspect of the embodiments solves the above problem.

SUMMARY OF THE INVENTION

One disclosed aspect of the embodiments provides a photoelectric conversion apparatus comprising a plurality of pixels, each of the pixels including a photoelectric conversion unit and a digital-signal output unit configured to output a digital signal based on the output of the photoelectric conversion unit; and a control unit configured to control the digital-signal output unit to switch the number of bits of the digital signal.

Further features of the disclosure will become apparent from the following description of exemplary embodiments with reference to the attached drawings.

DESCRIPTION OF THE EMBODIMENTS

First Embodiment

A first embodiment will be described with reference to the drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1:
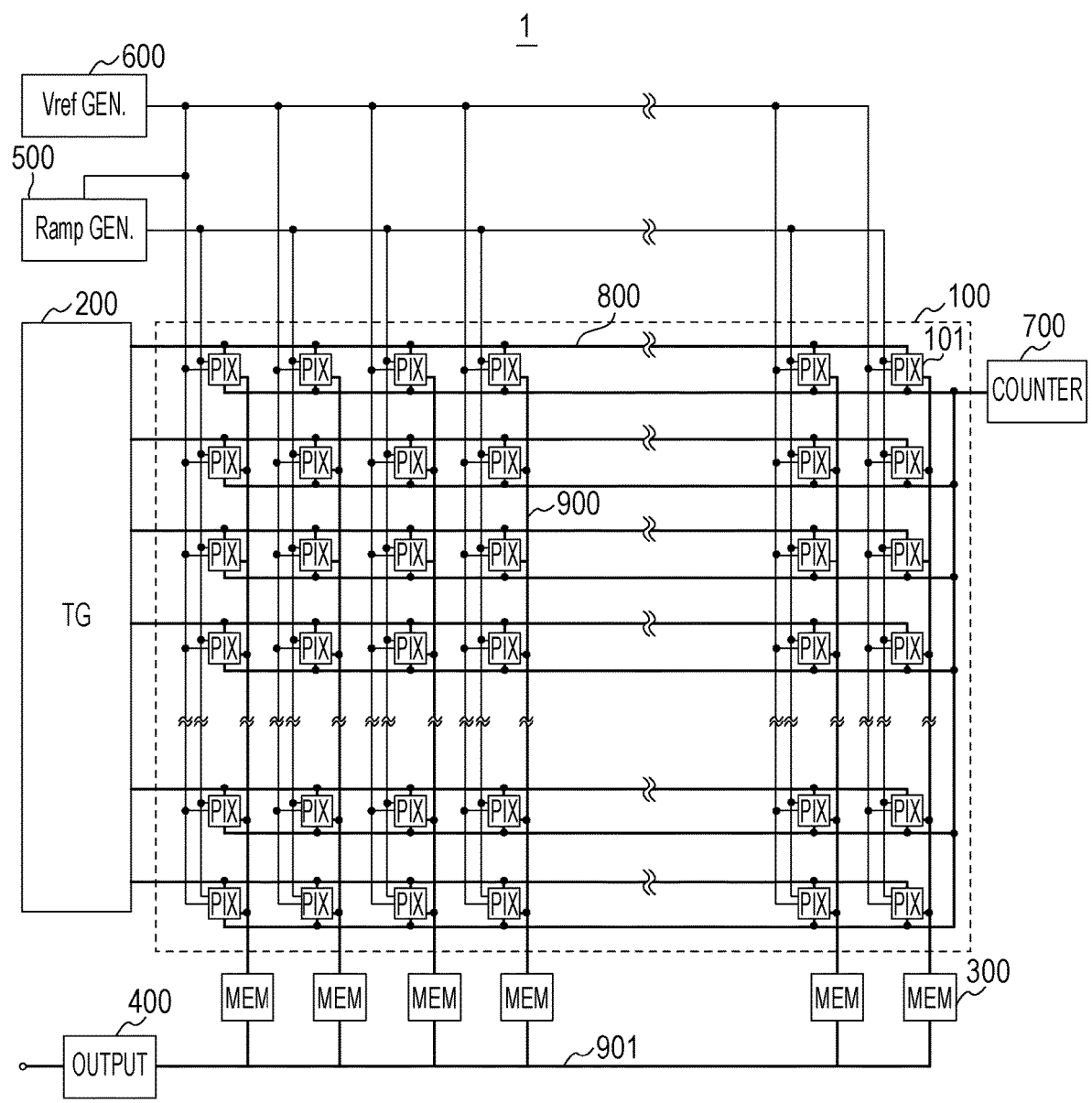
FIG. 1 is a block diagram showing the configuration of a photoelectric conversion apparatus according to a first embodiment.

FIG. 1 is a block diagram showing the configuration of a photoelectric conversion apparatus 1 according to the first embodiment. The photoelectric conversion apparatus 1 has a pixel array 100 in which a plurality of pixels 101 are arranged in a matrix form. The photoelectric conversion apparatus 1 further includes a timing generator 200, line memories 300, an output unit 400, a reference-signal generating unit 500, a reference-potential generating unit 600, and a counter 700.

The pixels 101 each include a photoelectric conversion unit and an AD conversion unit and output digital signals. In the first embodiment, the AD conversion unit serving as a digital-signal output unit can switch the number of bits of an output digital signal with a control unit.

The timing generator 200 generates a signal for controlling the operation of the photoelectric conversion apparatus 1 and supplies a control signal via a control-signal supply line 800. Although the control-signal supply line is expressed by one line for clarifying the drawing, it may include a plurality of signal lines.

The line memories 300 are provided in correspondence with the columns of the pixel array 100 and store digital signals transmitted via a vertical transfer bus 900. When selected by a column selection circuit (not shown), the selected line memory 300 outputs the stored digital signal. The digital signal output from the line memory 300 is transmitted to the output unit 400 via a horizontal transfer bus 901.

The vertical transfer bus 900 and the horizontal transfer bus 901 may be each configured by a single signal line. In this case, the pixels 101 and the line memories 300 output the digital signals in series. The vertical transfer bus 900 and the horizontal transfer bus 901 may be each configured by a plurality of signal lines. In this case, the pixels 101 and the line memories 300 output at least some of the digital signals in parallel. The number of signal lines that constitute the vertical transfer bus 900 may be set small. In other words, by setting the number of signal lines that constitute the vertical transfer bus 900 smaller than the number of signal lines that constitute the horizontal transfer bus 901, the area of the photoelectric conversion unit in the pixel array 100 may be larger than that of a case where the number of signal lines that constitute the vertical transfer bus 900 is equal to or smaller than the number of signal lines that constitute the horizontal transfer bus 901. This allows the sensitivity and saturated electrical charge of the photoelectric conversion apparatus 1 to be improved.

Figure 2:
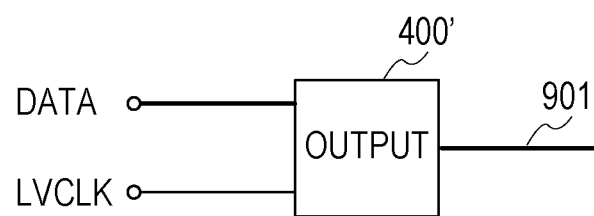
FIG. 2 is a block diagram showing another configuration of the photoelectric conversion apparatus according to the first embodiment.

The output unit 400 buffers digital signals input via the horizontal transfer bus 901. In addition, the output unit 400 may have a low voltage differential signaling (LVDS) configuration in which a digital signal DATA is output as a differential signal together with a synchronous clock signal LVCLK, as shown in FIG. 2. FIG. 2 shows the configuration of an output unit 400' that replaces the output unit 400 in FIG. 1. The clock signal LVCLK may be generated by dividing or multiplying an external clock signal in the output unit 400'.

Next, the operation timing of the photoelectric conversion apparatus 1 will be described.

Figure 3:
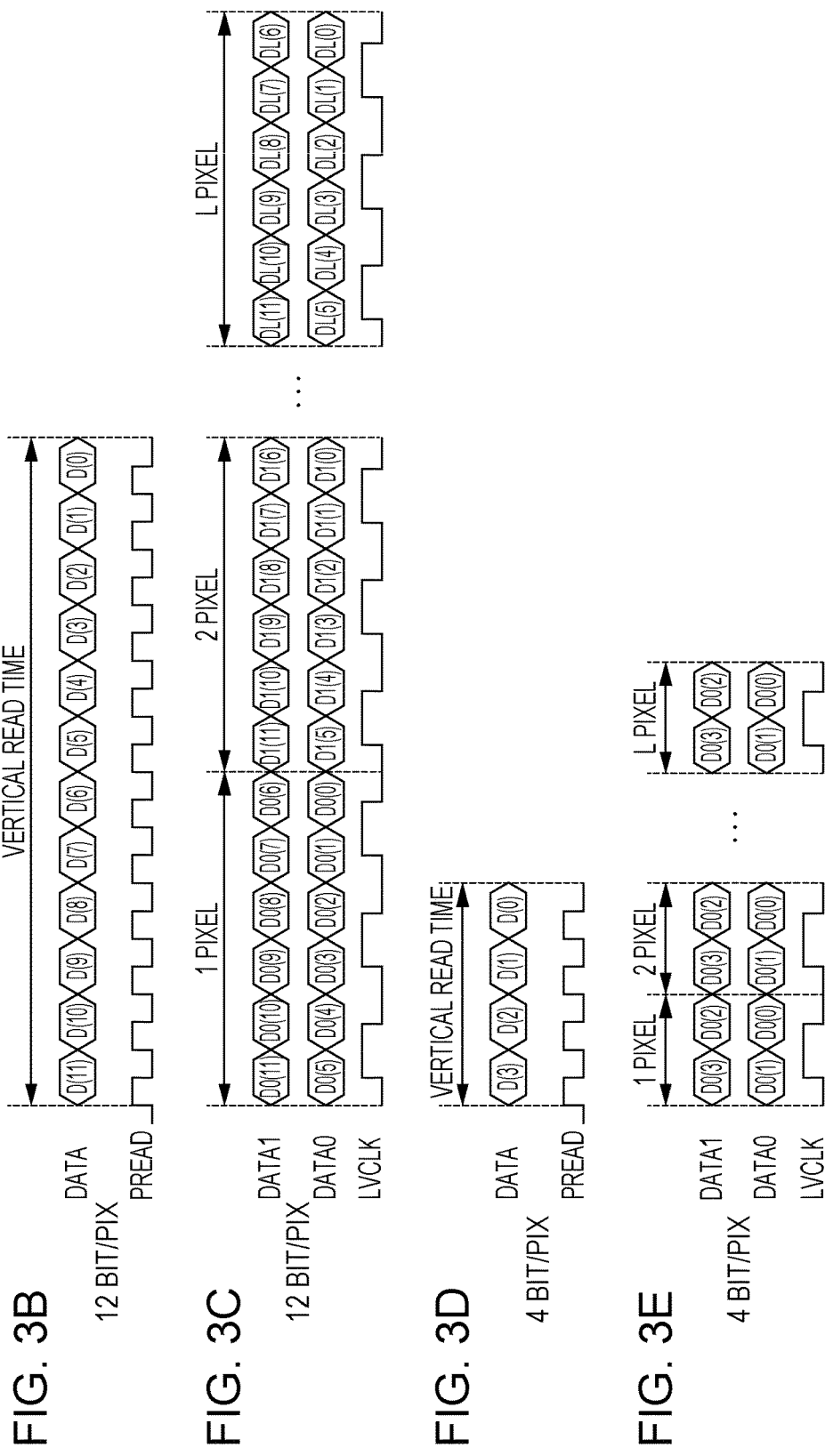
FIG. 3A is a diagram for explaining the overall operation timing according to the first embodiment.
FIG. 3B is a diagram showing an operation in a vertical transfer period.
FIG. 3C is a diagram showing an operation in a horizontal transfer period.
FIG. 3D is another diagram showing an operation in the vertical transfer period.
FIG. 3E is a diagram showing an operation in a horizontal transfer period.

FIG. 3A is a diagram for explaining the overall operation timing of the photoelectric conversion apparatus 1. Line 1, Line 2, - - - , Line M indicate the first row, the second row, - - - , the Mth row (M is a natural number) of the pixel array 100.

In FIG. 3A, read out operation of a row includes a vertical transfer period, Vertical Read, and a horizontal transfer period, Horizontal Read. In the vertical transfer period Vertical Read, the operation of outputting digital signals from the pixels 101 and storing the digital signals in the line memories 300 is performed. On the other hand, in the horizontal transfer period Horizontal Read, the operation of outputting the signals output from the line memories 300 from the output unit 400 is performed.

FIG. 3B is a diagram showing the operation in the vertical transfer period Vertical Read. Digital signals DATA output from the pixels 101 are 12-bit serial signals having D(11), D(10), - - - , D(0) bits from the most significant bit) to the least significant bit. The digital signals DATA are sequentially output in synchronization with the rise of a clock signal PREAD that the timing generator 200 generates.

FIG. 3C is a diagram showing an operation in the horizontal transfer period Horizontal Read performed following the vertical transfer period Vertical Read shown in FIG. 3B. FIG. 3C shows an operation example of 2-bit parallel output using the configuration of the output unit 400' shown in FIG. 2. Higher 6-bit signals are sequentially output from one output port DATA1, and lower 6-bit signals are sequentially output from the other output port DATA0. FIG. 3C shows an example in which the output unit 400' generates therein a signal obtained by doubling the clock signal LVCLK and the digital signals are output in synchronization therewith.

FIG. 3D is another diagram showing an operation in the vertical transfer period Vertical Read. Here, the digital signals DATA output from the pixels 101 have four bits.

FIG. 3E is a diagram showing an operation in the horizontal transfer period Horizontal Read following the vertical transfer period Vertical Read shown in FIG. 3D. FIG. 3E shows an operation example of 2-bit parallel output using the configuration of the output unit 400' shown in FIG. 2. Higher 2-bit signals are sequentially output from one output port DATA1, and lower 2-bit signals are sequentially output from the other output port DATA0.

Figure 4:
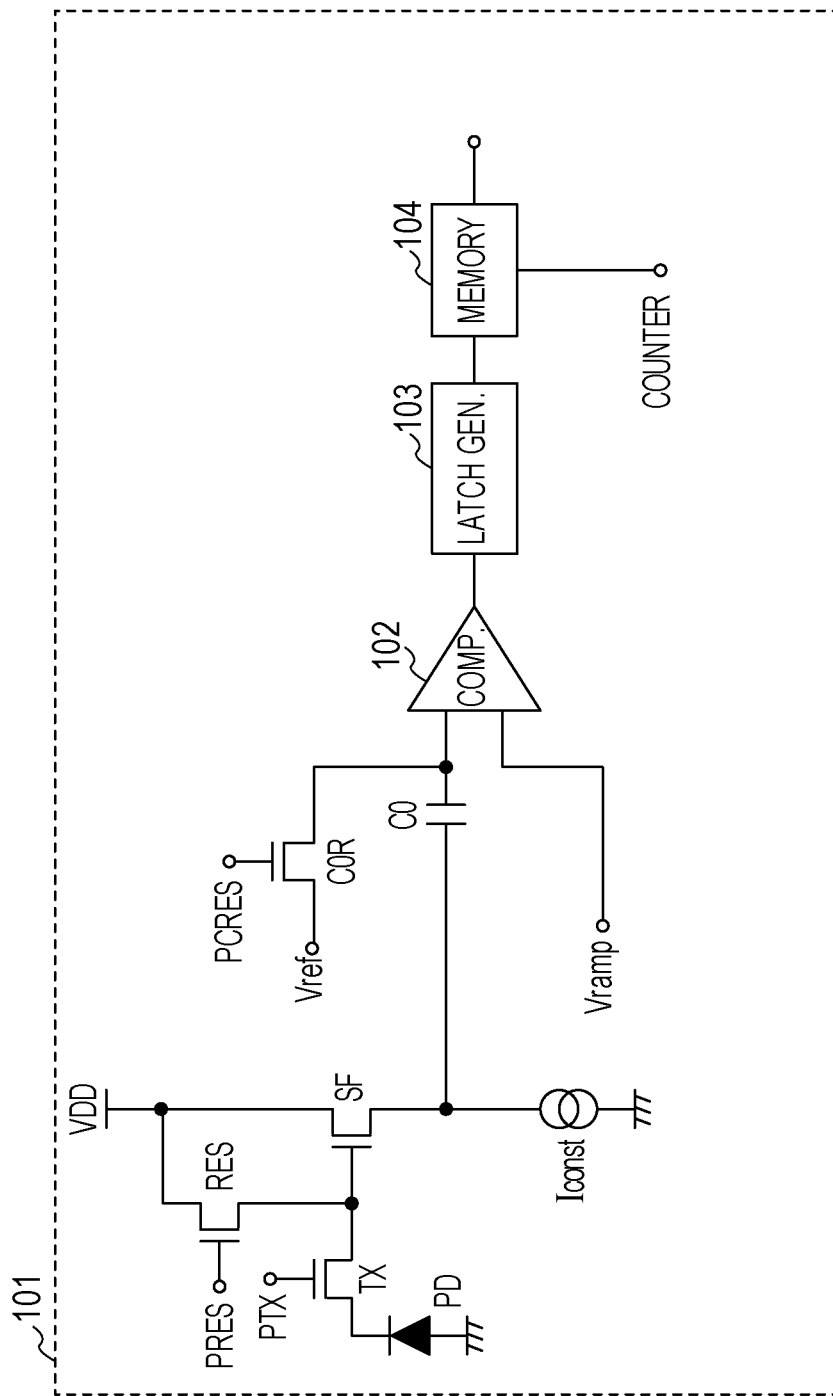
FIG. 4 is a diagram showing the configuration of one of the pixels according to the first embodiment.

Next, an example of the configuration of the pixels 101 will be described. FIG. 4 is a diagram showing the configuration of one of the pixels 101 in the first embodiment.

The pixel 101 includes a photoelectric conversion unit PD, transistors TX, SF, RES, and COR, a capacitor C0, a comparator 102, a latch-signal generating unit 103, and an in-pixel memory 104. The pixel 101 has an AD conversion unit, and the AD conversion unit includes at least the comparator 102. In the first embodiment, the AD conversion unit further includes the latch-signal generating unit 103 and the in-pixel memory 104.

The photoelectric conversion unit PD generates and accumulates electrical charges depending on the quantity of incident light. When a signal PTX that controls the electrical conduction of the transistor TX become active, the electrical charges accumulated in the photoelectric conversion unit PD are transferred to the node of a control electrode of the transistor SF. This node is hereinafter referred to as a floating diffusion portion (FD portion). The transistor SF operates as a source follower circuit together with a constant current source Iconst, and the output therefrom is given to one of the input terminals of the comparator 102 via the capacitor C0. When a signal PRES that controls the electrical conduction of the transistor RES becomes active, the potential of the FD portion is reset depending on a power supply VDD.

When a signal PORES that controls the transistor COR becomes active, one of the terminals of the comparator 102 is reset depending on a reference potential Vref.

The comparator 102 compares the level of the potential of one of the input terminals and the level of a reference signal Vramp given to the other input terminal. When the levels of potentials at both input terminals of the comparator 102 are reversed, the level of the output of the comparator 102 is also reversed. When the output of the comparator 102 is reversed, the latch-signal generating unit 103 outputs a latch signal.

Upon receiving the latch signal, the in-pixel memory 104 stores the count value of the counter 700 at that time. Furthermore, upon receiving a selection signal (not shown), the in-pixel memory 104 outputs a digital signal.

Figure 5:
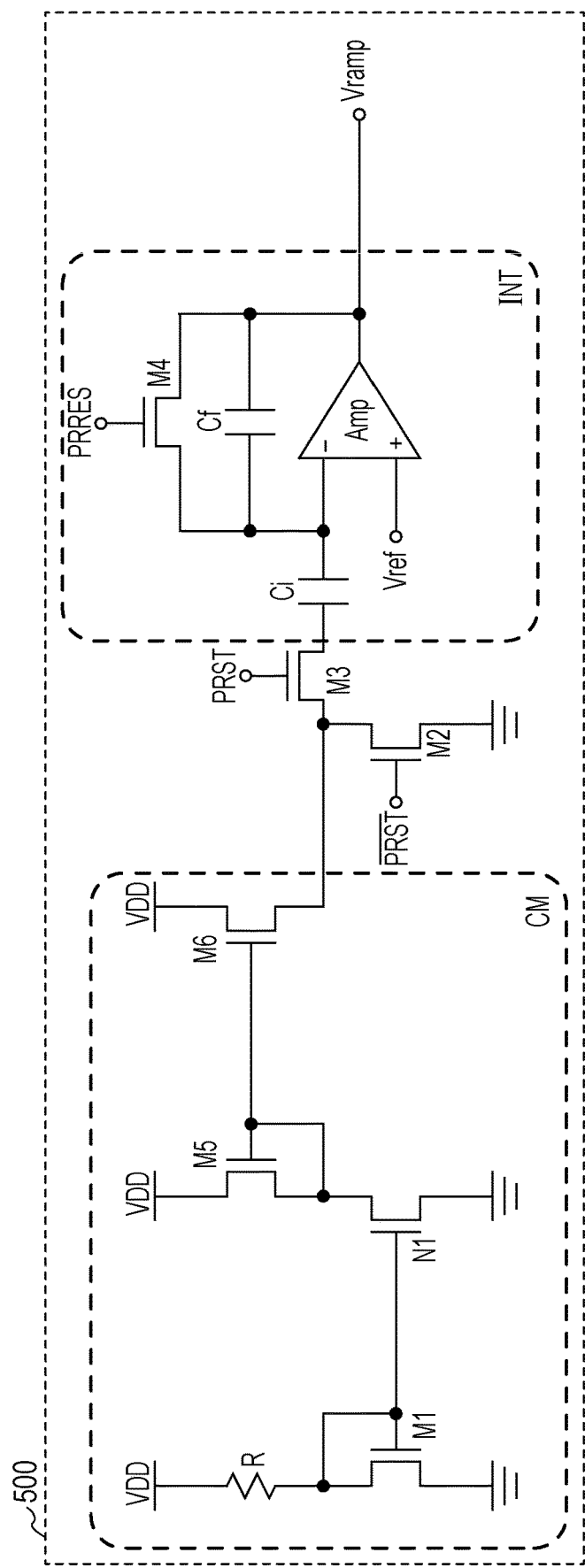
FIG. 5 is a diagram showing an example of the configuration of a reference-signal generating unit according to the first embodiment.

Next, an example of the configuration of the reference-signal generating unit 500 will be described. FIG. 5 is a diagram showing an example of the configuration of the reference-signal generating unit 500 in the first embodiment.

The reference-signal generating unit 500 includes a current mirror CM, transistors M2 and M3, a capacitor C1, and an integration unit INT.

The current mirror CM includes a resistor R, transistors M1, M5, M6, and N1. The resistor R and the transistor M1 are connected in series between the power supply VDD and a ground voltage GND. The control electrode of the transistor M1 is connected to a common contact between the resistor R and a main electrode of the transistor M1. One of the main electrodes of the transistor N1 is connected to the ground voltage GND and the other main electrode is connected to one of the main electrodes and the control electrode of the transistor M5. The control electrode of the transistor N1 is connected to the control electrode of the transistor M1. The other main electrode of the transistor M5 is connected to the power supply VDD, and the control electrode is also connected to the control electrode of the transistor M6. One of the main electrodes of the transistor M6 is connected to a common contact between the transistors M2 and M3.

The integration unit INT includes an integrating circuit constituted by a differential amplifier Amp and a feedback capacitor Cf and further includes a transistor M4 for resetting the feedback capacitor Cf.

The current mirror CM and the integration unit INT are connected together via the transistor M3 and the capacitor Ci. The transistor M3 is controlled by a signal of opposite polarity to that of a signal that controls the operation of the transistor M2.

Figure 6:
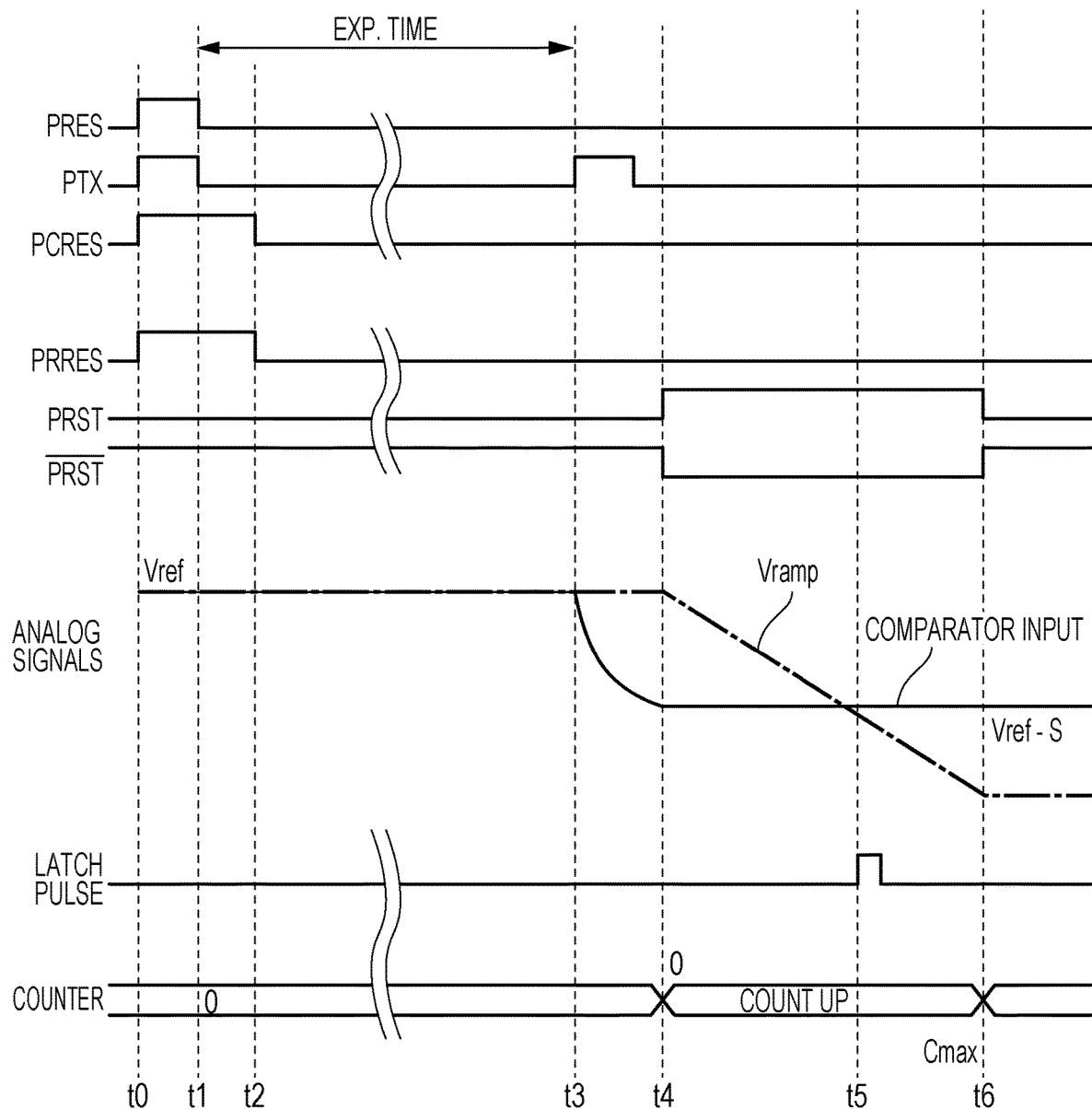
FIG. 6 is a timing chart showing the operation of the pixels according to the first embodiment.

Next, an operation of the pixels 101 for generating digital signals will be described. FIG. 6 is a timing chart explaining the operation of the pixels 101 according to the first embodiment. Assume that the transistors TX, SF, RES, COR, M1, M2, M3, M5, M6, and N1 shown in FIGS. 4 and 5 become conducting when given control signals reach a high level. In FIG. 6, the potential of one of the input terminals of the comparator 102 is indicated as comparator input by a solid line, and the output of the reference-signal generating unit 500 is indicated as Vramp by a one-dot chain line on analog signals. The latch signal that the latch-signal generating unit 103 outputs is indicated as latch pulse, and the count value of the counter 700 is indicated as counter.

At time t0, the signals PRES and PTX reach a high level to bring the transistors TX and RES into conduction. This causes the electrical charges accumulated in the photoelectric conversion unit PD to be discharged to the power supply VDD via the FD portion. The output of the source follower circuit constituted by the transistor SF and the constant current source Iconst corresponds to the power supply VDD.

Since a signal PRST at time t0 is at a low level, the transistor M3 is non-conducting, and the transistor M2 is conducting.

At time t0, the signal PORES also reaches a high level to bring the transistor COR into conduction. This causes one of the input terminals of the comparator 102 to be reset.

At time t0, a signal PRRES also reaches a high level to bring the transistor M4 into conduction. This causes the feedback capacitor Cf of the reference-signal generating unit 500 to be reset.

At time t1, the signals PRES and PTX reach a low level to bring the transistors TX and RES out of conduction. The photoelectric conversion unit PD is electrically interrupted from the FD portion into a state in which it may accumulate electrical charges.

At time t2, the signal PORES reaches a low level to bring the transistor COR out of conduction. This allows the capacitor C0 to store a potential difference between the potential due to the reset of the FD portion and the reference potential Vref.

At time t2, the signal PRRES also reaches a low level to bring the transistor M4 out of conduction. Thus, the reset of the feedback capacitor Cf ends.

At time t3, the signal PTX reaches a high level, and thus, the electrical charges accumulated in the photoelectric conversion unit PD are transferred to the FD portion. This causes the output of the source follower circuit to be changed. Let S be a change in output. The potential of one of the input terminals of the comparator 102 may be expressed as Vref−S. The period from time t1 to the time when the signal PTX, which reaches a high level at time t3, reaches a low level is the accumulation period.

At time t4, the signal PRST reaches a high level to bring the transistor M3 into conduction and to bring the transistor M2 out of conduction. Since this brings the path between the current mirror CM and the capacitor Ci into conduction, the output RAMP of the integrating circuit decreases gradually depending on the amount of current supplied by the current mirror CM.

Furthermore, the counter 700 starts a counting operation in synchronization with the operations of the transistors M2 and M3.

At time t5, the levels of the comparator input and Vramp are reversed, and then, the latch-signal generating unit 103 outputs a high-level latch signal. Upon receiving the latch signal, the in-pixel memory 104 stores the count value at that time.

At time t6, the signal PRST reaches a low level, and then, the gradual decrease in the reference signal Vramp stops, and the AD conversion period ends.

Here, how the number of bits of the digital signals that the pixels 101 output is switched will be described. One example is a method of switching the resolution of AD conversion. Specifically, in FIG. 6, the counting operation of the counter 700 is slowed down by decreasing the frequency of a clock signal for controlling the counting operation. This may reduce the possible range of the count values from time t4 to t6. Another method is transferring only higher bits of the count values stored in the in-pixel memory 104 to the vertical transfer period Vertical Read. The switching of the number of bits is performed by a control unit (not shown).

Figure 7:
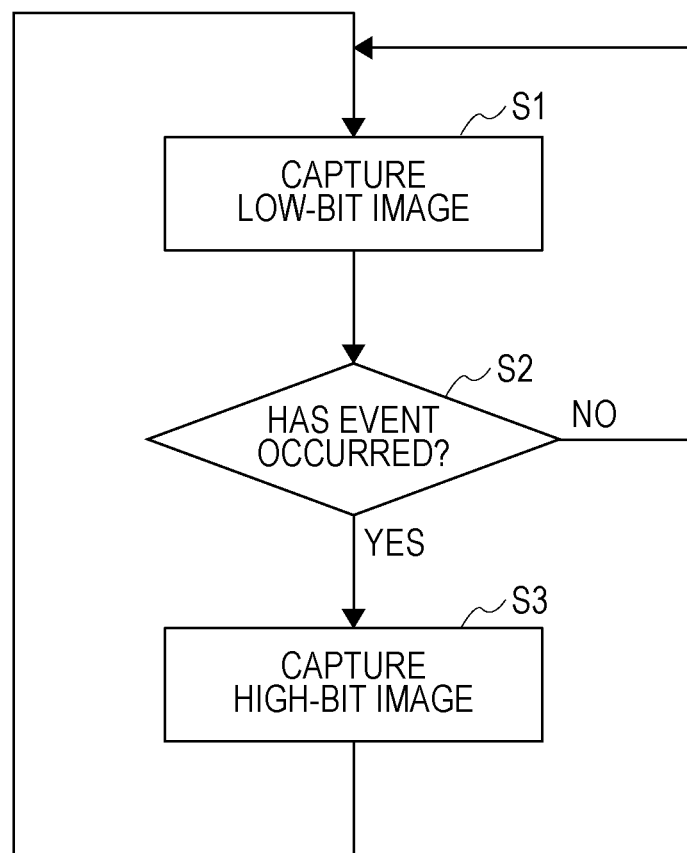
FIG. 7 is a flowchart explaining an operation according to the first embodiment.

Next, the operation of switching the number of bits that the pixels 101 output will be described. FIG. 7 is a flowchart explaining an operation according to the first embodiment.

In step S1, the photoelectric conversion apparatus 1 operates in a first operation mode in which the number of bits that the pixels 101 output is reduced. In the first operation mode, since the number of bits output is small, an image obtained is a low-bit image. However, the amount of data is small, and thus, the frame rate may be high.

The process proceeds to step S2, in which an event detection unit (not shown) detects whether an event has occurred. Examples of the event include detection of a moving object, human body, face, etc. in an image-capturing scene, detection of an object having the same shape as that registered in a database, and detection of a light quantity higher than or equal to a preset value.

In step S2, if occurrence of an event is not detected (No), the process returns to step S1, in which low-bit-image capturing is performed. On the other hand, if occurrence of an event is detected in step S2 (Yes), the process proceeds to step S3.

In step S3, the photoelectric conversion apparatus 1 operates in a second operation mode in which digital signals having bits larger than the number of bits that the pixels 101 output in step S1 are output from the pixels 101. Although an image captured in step S3 is a high-bit image, the frame rate is lower than that in the first operation mode because it has a large data amount.

A possible application of the operation shown in FIG. 7 is to monitor cameras, in which a low-bit image is normally captured in the first operation mode at a high frame rate, and if an event is detected in an image-capturing scene, the mode is shifted to the second operation mode, in which a high-bit image is captured. Another possible application is to digital cameras, in which a moving image is captured in the first operation mode until a human face is detected in an image-capturing scene, and when a human face is detected, a high-bit still image is captured in the second operation mode.

As described above, the first embodiment allows high-speed read out depending on the application by switching the number of bits of digital signals that the pixels 101 output.

Second Embodiment

A second embodiment will be described.

Figure 8:
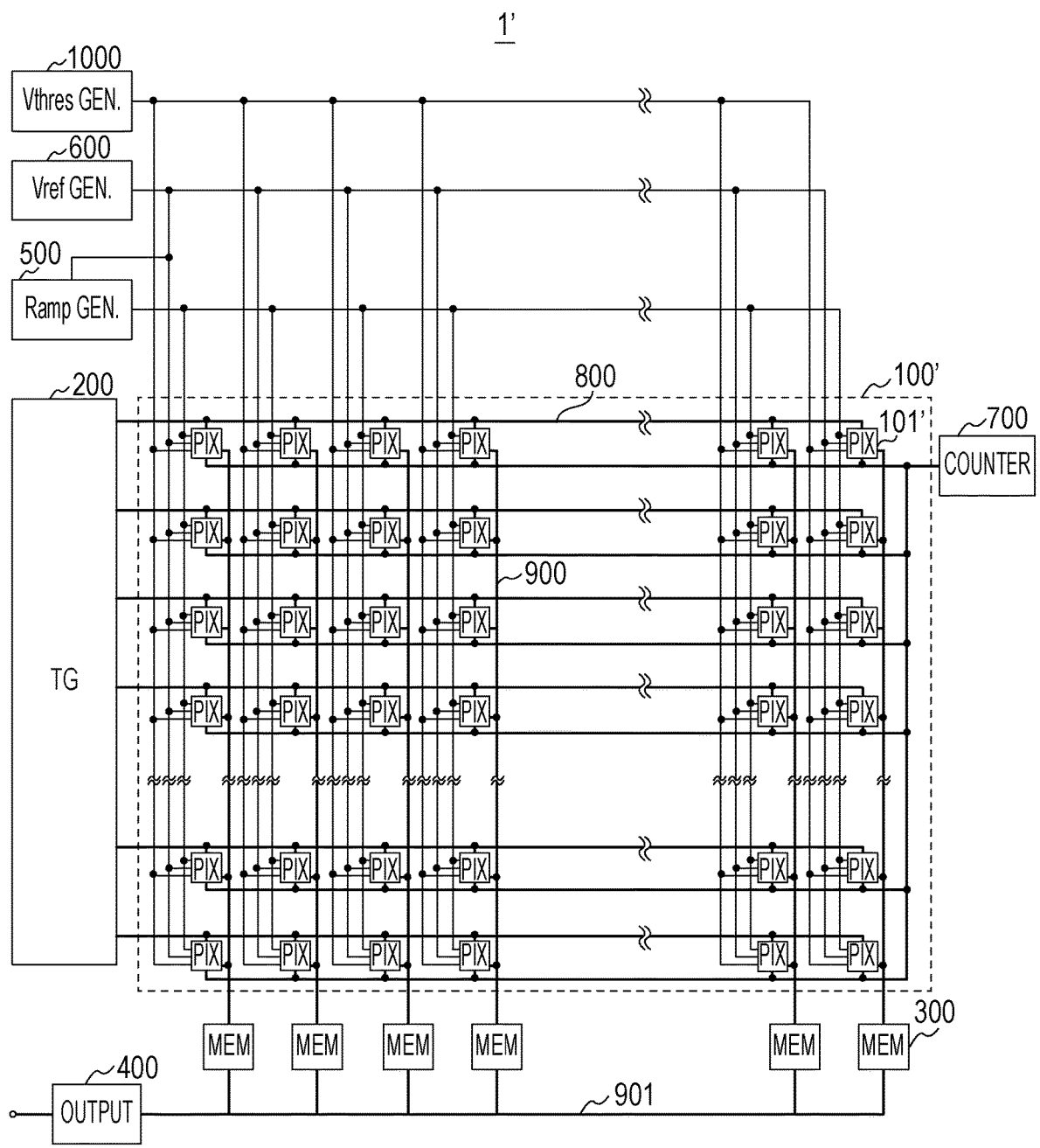
FIG. 8 is a block diagram showing the configuration of a photoelectric conversion apparatus according to a second embodiment.

FIG. 8 is a block diagram showing the configuration of a photoelectric conversion apparatus 1' according to the second embodiment. Elements common to the photoelectric conversion apparatus 1 shown in FIG. 1 are given the same reference signs. The photoelectric conversion apparatus 1' may output binary digital signals from pixels 101'. The photoelectric conversion apparatus 1' includes a threshold-voltage generating unit 1000.

Figure 9:
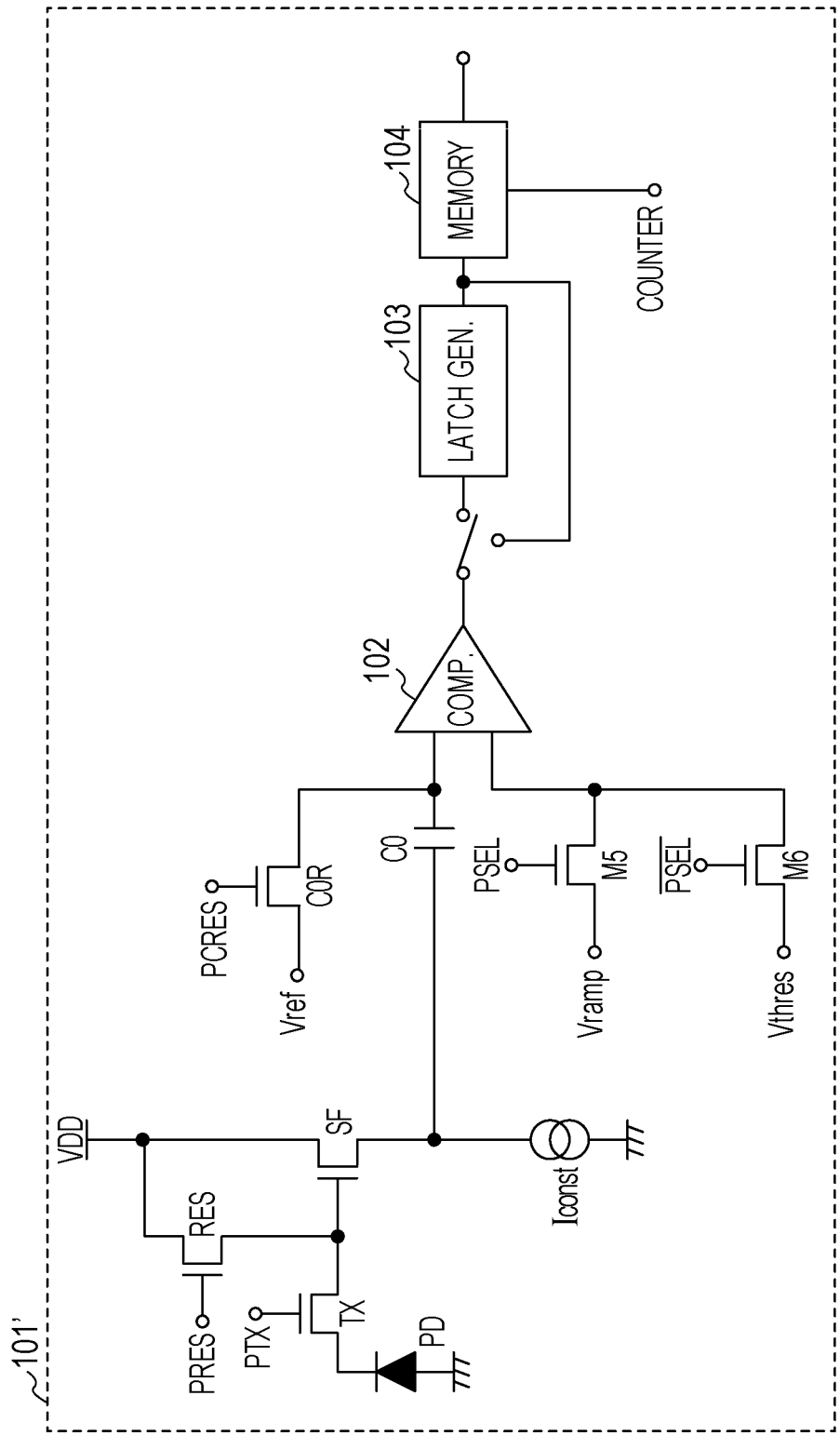
FIG. 9 is a diagram showing the configuration of one of pixels according to the second embodiment.

FIG. 9 is a diagram showing the configuration of one of the pixels 101' according to the second embodiment. A difference from the pixels 101 is that the transistors M5 and M6 are connected in parallel with an input terminal of the comparator 102. Another difference is that the output terminal of the comparator 102 is configured to be selectively connected to the input of the latch-signal generating unit 103 and the input of the in-pixel memory 104.

When the transistor M5 is brought into conduction by a control signal PSEL, a reference signal Vramp is supplied to the input terminal of the comparator 102. On the other hand, when the transistor M5 is brought into conduction by a control signal /PSEL, a threshold voltage Vthres supplied from the threshold-voltage generating unit 1000 is given to the input terminal of the comparator 102. The control signals PSEL and /PSEL are signals in opposite phase.

If the control signal PSEL is at a high level, the output of the comparator 102 is guided to the latch-signal generating unit 103, where the operation shown in FIG. 6 is performed.

On the other hand, an operation in the case where the control signal PSEL is at a low level will be described. In this case, the output of the comparator 102 is guided not to the latch-signal generating unit 103 but to the in-pixel memory 104. More specifically, the comparator 102 is connected to one of memories having a plurality of bits in the in-pixel memory 104. Accordingly, in the operation shown in FIG. 6, the output of the comparator 102 is binarized to H or L in the period corresponding to time t4 to t6 and is stored in the in-pixel memory 104. The threshold voltage Vthres is a fixed value, which may be changed from the outside.

According to the second embodiment, the binarization of the digital signals output from the pixels 101' allows edge detection of a subject in an image-capturing scene. Since the second embodiment uses the fixed threshold voltage Vthres, the period from time t4 to t6 in FIG. 6 may be reduced.

Also in the second embodiment, high-speed read out depending on the application may be achieved by switching the number of bits of digital signals that the pixels 101' output.

Third Embodiment

A third embodiment will be described.

Figure 10:
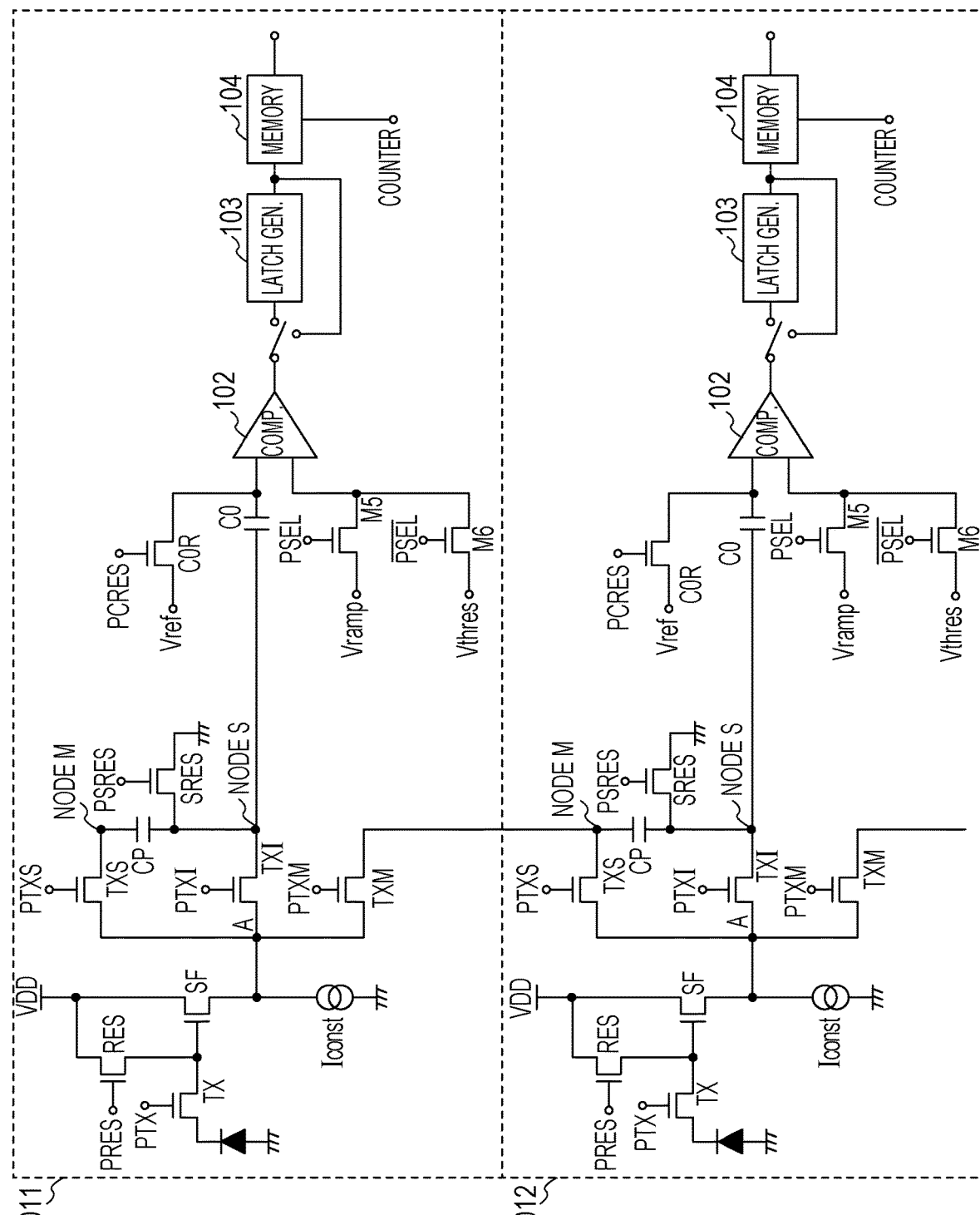
FIG. 10 is a diagram showing the configuration of pixels according to a third embodiment.

FIG. 10 is a diagram showing the configuration of pixels according to the third embodiment. Here, two adjacent pixels 1011 and 1012 are extracted. An orientation in which the two pixels 1011 and 1012 are adjacent to each other is not particularly limited. The third embodiment differs from the foregoing embodiments in that a difference operation between two pixels may be performed.

Since the pixels 1011 and 1012 have the same configuration, merely a description of the pixel 1011 is given, and a description of the pixel 1012 will be omitted. The pixel 1011 differs from the pixel 101' shown in FIG. 9 in that it further includes transistors TXI, TXS, TXM, and SRES and a capacitor CP.

In the pixel 1011, the transistors TXI, TXS, and TXM are connected in parallel with a node A to which the output terminal of a source follower circuit constituted by the transistor SF and the constant current source Iconst is connected. The transistor TXI is connected between the node A and a node S, and the conduction thereof is controlled by a signal PTXI. The transistor TXM is connected between the node A and a node M of the pixel 1012, and the conduction thereof is controlled by a signal PTXM. The capacitor CP is connected between the node S and a node M. The transistor SRES is connected to the node S. In other words, the two pixels 1011 and 1012 are connected via the transistor TXM.

The operation of the third embodiment will be described.

First, when the signal PTXM is maintained at a low level, the pixels 1011 and 1012 are electrically interrupted from each other, which allows them to be independently operated. In this state, maintaining the signal PTXI at a high level allows the third embodiment to be operated as in the second embodiment.

Next, an operation for calculation between pixels, with the signal PTXM at a high level, will be described. In this operation, the signal PTXI is maintained at a low level.

Figure 11:
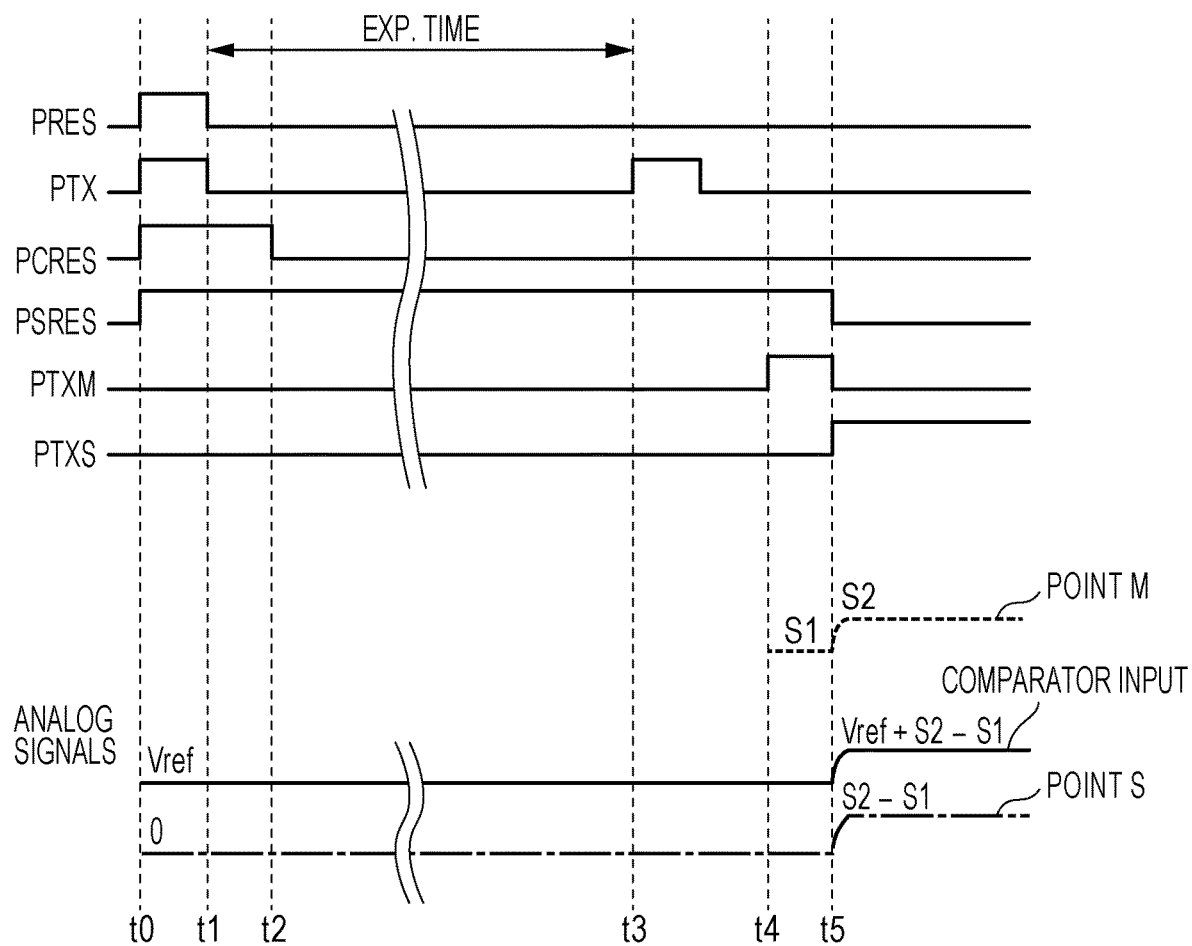
FIG. 11 is a timing chart showing the operation of pixels according to the third embodiment.

FIG. 11 is a timing chart showing the operation of the pixels according to the third embodiment. The potential of an input terminal of the comparator 102 is expressed as comparator input, and the potentials of the node M and node S are expressed as node M and node S, respectively.

At time t0, the signals PRES and PTX reach a high level to bring the transistors RES and TX into conduction. This causes electrical charges accumulated in the photoelectric conversion unit PD to be discharged to the power supply VDD via the FD portion. The output of the source follower circuit constituted by the transistor SF and the constant current source Iconst corresponds to the power supply VDD.

Since a signal PSRES reaches a high level at time t0, the node S is given the GND potential via the transistor SRES.

At time t1, the signals PRES and PTX reach a low level to bring the transistors RES and TX out of conduction. The photoelectric conversion unit PD is electrically interrupted from the FD portion into a state in which it may accumulate electrical charges.

At time t2, a signal PORES reaches a low level to bring the transistor COR out of conduction. This allows the capacitor C0 to store a potential difference between the GND potential and the reference potential Vref.

At time t3, the signal PTX reaches a high level, and thus, the electrical charges accumulated in the photoelectric conversion unit PD are transferred to the FD portion. The period from time t1 to the time when the signal PTX, which reaches a high level at time t3, reaches a low level is the accumulation period.

At time t4, the signal PTXM reaches a high level to bring the transistor TXM into conduction. This brings the node A of the pixel 1011 and the node M of the pixel 1012 into conduction. At that time, the capacitor CP of the pixel 1012 is given the potential difference between the GND potential and the node S of the pixel 1011.

At time t5, the signals PSRES and PTXM reach a low level to bring the transistors SRES and TXM out of conduction. This allows the potential difference given at time t4 to be stored in the capacitor CP.

At time t5, a signal PTXS reaches a low level to bring the transistor TXS to a high level. This allows the capacitor CP of the pixel 1012 to be connected to the source follower circuit of the pixel 1012. Since the capacitor CP holds a signal based on the pixel 1011 with reference to the GND potential, the operation at time t5 causes a difference in output between the pixels 1011 and 1012 at time t5 at the node S of the pixel 1012. By comparing the difference with the threshold voltage Vthres using the comparator 102, the difference between the pixels 1011 and 1012 may be binarized, thus allowing edge detection. In other words, it may be determined whether the contrast, which is the difference in signal level between pixels, exceeds a given threshold. Also for the pixel 1011, the edge detection between it and another pixel connected thereto via the node M may be performed.

Also in the third embodiment, the photoelectric conversion apparatus 1 may be operated in the sequence, as shown in FIG. 7. In step S1, the photoelectric conversion apparatus 1 performs detection of edges between pixels, and when an event is detected, a high-bit image is captured. Since the digital signal has been binarized before the edge detection, the number of bits output from the pixels is one. This makes it easy to improve the frame rate.

Also in the third embodiment, high-speed read out depending on the application may be achieved by switching the number of bits of digital signals that the pixels 1011 and 1012 output.

Fourth Embodiment

A fourth embodiment will be described.

Figure 12:
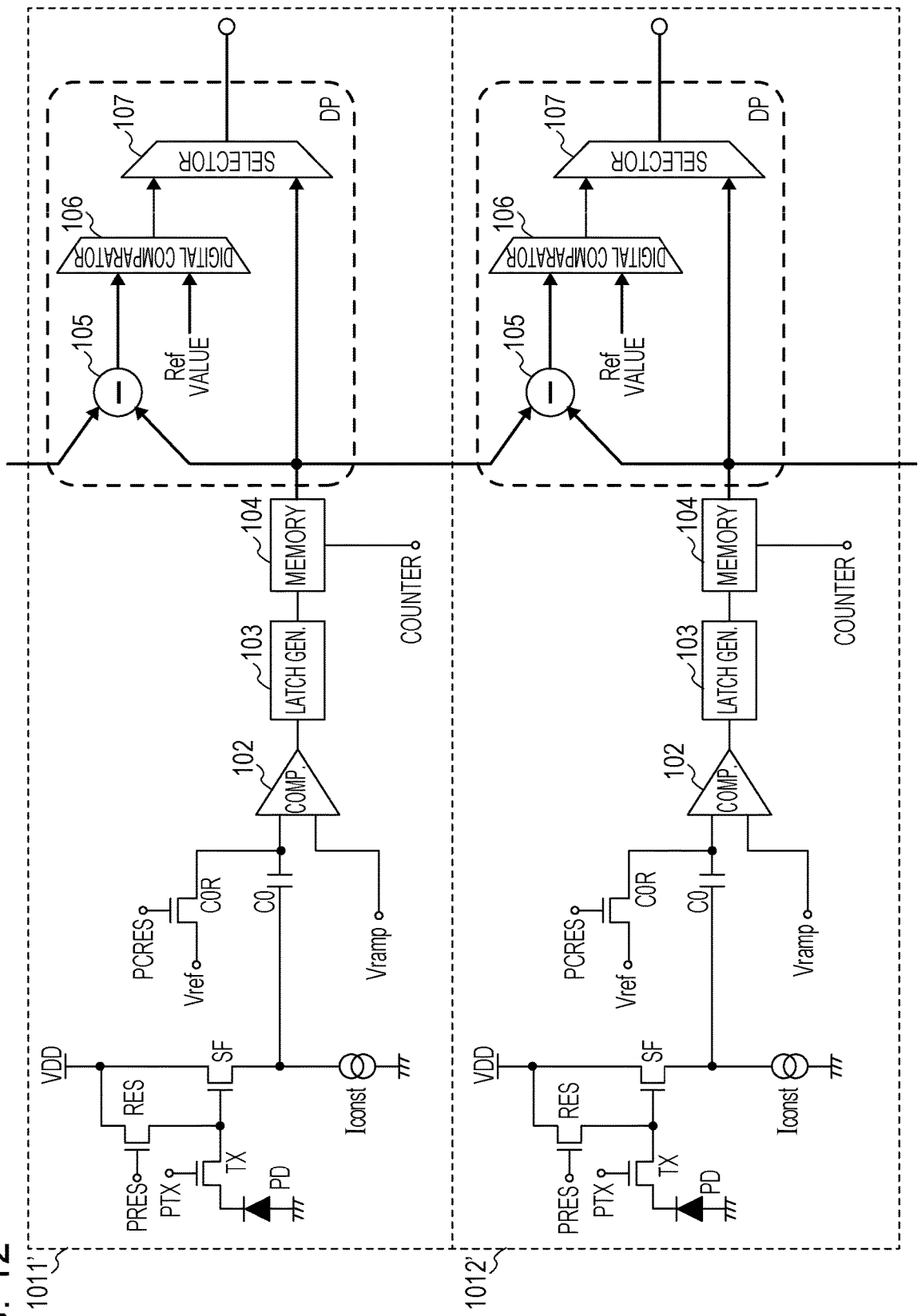
FIG. 12 is a diagram showing the configuration of pixels according to a fourth embodiment.

FIG. 12 is a diagram showing the configuration of pixels according to the fourth embodiment. Here, two adjacent pixels 1011' and 1012' are extracted. An orientation in which the two pixels 1011' and 1012' are adjacent to each other is not particularly limited. In the fourth embodiment, a difference operation between two pixels may be performed as in the third embodiment. The fourth embodiment differs from the third embodiment in that a difference operation is performed using a digital signal, although the third embodiment performs a difference operation using an analog signal.

Since the pixels 1011' and 1012' have the same configuration, merely a description of the pixel 1011' is given, and a description of the pixel 1012' will be omitted. The pixel 1011' differs from the pixel 101 shown in FIG. 4 in that the digital-signal output unit includes a digital calculation unit DP.

Since the operation of acquiring a digital signal in the pixel 1011' is the same as that in the first embodiment, a description thereof will be omitted.

The digital calculation unit DP includes a digital subtraction portion 105, digital comparator 106, and a digital selector 107.

The output of the in-pixel memory 104 of the pixel 1011' is given to the digital subtraction portion 105 of the pixel 1011', the digital selector 107 of the pixel 1011', and the digital subtraction portion 105 of the pixel 1012'.

The digital subtraction portion 105 of the pixel 1012' outputs the difference between the digital signals output from the in-pixel memories 104 of the pixels 1011' and 1012'.

The difference output from the digital subtraction portion 105 is compared with a reference value Ref Value by the digital comparator 106, the level relationship between the difference and the reference value Ref Value is binarized, and the binarized value is output. Although the reference value Ref Value is given as a fixed value, it may be changed.

The digital selector 107 selects the output of the digital comparator 106 or the output of the in-pixel memory 104 in accordance with a control signal (not shown). In other words, the number of bits of a digital signal that the AD conversion unit outputs is switched by the digital selector 107.

Fifth Embodiment

Figure 13:
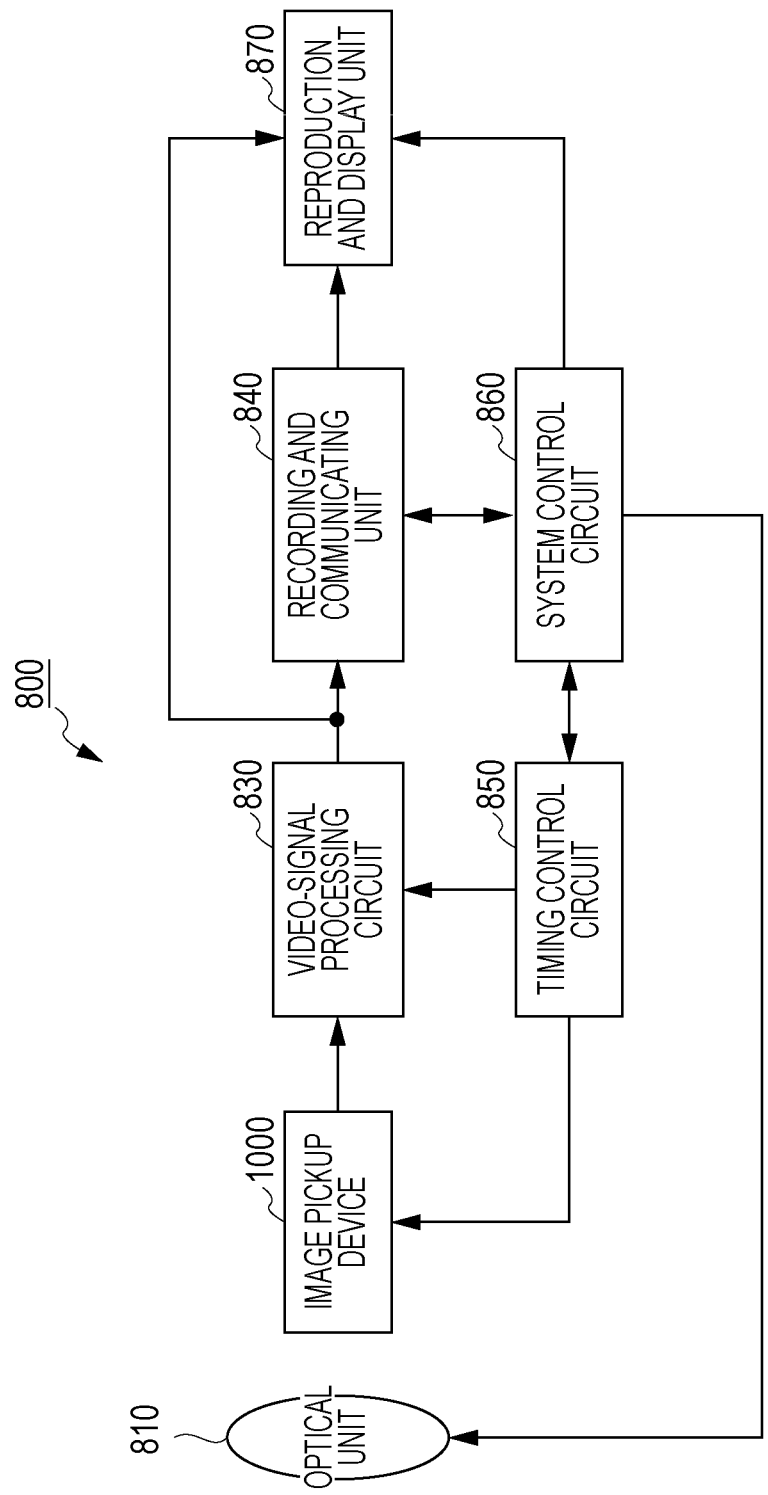
FIG. 13 is a block diagram showing the configuration of an image pickup system according to a fifth embodiment.

Next, the outline of an image pickup system 800 according to a fifth embodiment will be described with reference to FIG. 13.

The image pickup system 800 includes, for example, an optical unit 810, an image pickup device 1000, a video-signal processing circuit 830, a recording and communicating unit 840, a timing control circuit 850, a system control circuit 860, and a reproduction and display unit 870. The photoelectric conversion apparatuses described in the foregoing embodiments are used as the image pickup device 1000. Here, a case in which the timing generator 200 shown in FIG. 1 is included, not in the image pickup device 1000, but in the timing control circuit 850, is shown.

The optical unit 810, which is an optical system, such as a lens, focuses light from a subject on a pixel array of the image pickup device 1000 in which a plurality of pixels are arrayed in two dimensions to form an image of the subject. The image pickup device 1000 outputs a signal corresponding to the light focused on the pixel portion at a timing based on a signal from the timing control circuit 850.

The signal output from the image pickup device 1000 is input to the video-signal processing circuit 830 serving as a video-signal processing unit. The video-signal processing circuit 830 processes the input electrical signal in accordance with a method determined by a program or the like. The signal obtained through the process of the video-signal processing circuit 830 is transmitted as image data to the recording and communicating unit 840. The recording and communicating unit 840 transmits a signal for forming an image to the reproduction and display unit 870 to cause the reproduction and display unit 870 to reproduce or display a moving image or a still image. The recording and communicating unit 840 also receives a signal sent from the video-signal processing circuit 830 and communicates with the system control circuit 860, and also performs the operation of recording the signal for forming an image on a recording medium (not shown).

The system control circuit 860 controls the overall operation of the image pickup system 800 and controls driving of the optical unit 810, the timing control circuit 850, the recording and communicating unit 840, and the reproduction and display unit 870. The system control circuit 860 is equipped with a storage unit (not shown), such as a recording medium, in which a program necessary for controlling the operation of the image pickup system 800, and so on are stored. The system control circuit 860 supplies a signal for switching the operation mode, for example, in accordance with the operation of the user, in the image pickup system 800. Specific examples include changing the row to be read or reset, changing the angle of view along with electronic zooming, and shifting the angle of view along with electronic image stabilization. In addition, the system control circuit 860 performs switching of the operation mode in the foregoing embodiments and switching of the output of the digital selector 107 in the fourth embodiment.

The timing control circuit 850 controls the drive timing of the image pickup device 1000 and the video-signal processing circuit 830 under the control of the system control circuit 860 serving as a control unit.

The embodiments described above are merely examples for explaining the disclosure, and various changes and combinations thereof may be made without departing from the technical spirit of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A photoelectric conversion apparatus comprising:
a plurality of pixels, each of the plurality of pixels including a photoelectric conversion unit arranged in columns and rows and each configured to generate an electrical charge;
a plurality of digital signal generation units arranged in columns and rows and each configured to generate a digital signal based on the electrical charge; and
a control unit,
wherein the plurality of digital signal generation units generates a first digital signal during a first period in a case where a predetermined event does not occur, and
wherein the control unit controls the plurality of digital signal generation units to generate a second digital signal in a second period longer than the first period in a case where the predetermined event occurs.

2. A photoelectric conversion apparatus comprising:
a plurality of photoelectric conversion units arranged in columns and rows and each configured to generate an electrical charge;
a plurality of digital signal generation units arranged in columns and rows and each configured to generate a digital signal based on the electrical charge; and
a control unit,
wherein the plurality of digital signal generation units generates a first digital signal during a first period in a case where a predetermined event is not detected, and
wherein the control unit controls the plurality of digital signal generation units to generate a second digital signal in a second period longer than the first period in a case where the predetermined event is detected.

3. A photoelectric conversion apparatus comprising:
a plurality of photoelectric conversion units arranged in columns and rows and each configured to generate an electrical charge;
a plurality of digital signal generation units arranged in columns and rows and each configured to generate a digital signal based on the electrical charge; and
a control unit,
wherein the plurality of digital signal generation units generates a first digital signal during a first period,
wherein whether a predetermined event occurs is determined based on the first digital signal, and the control unit controls the plurality of digital signal generation units to generate a second digital signal in a second period longer than the first period in a case where the predetermined event is detected as a result of the determination.

4. The photoelectric conversion apparatus according to claim 1, wherein the predetermined event is that one of a moving object, a face, and a human body is included in an image-capturing scene.

5. The photoelectric conversion apparatus according to claim 2, wherein the predetermined event is that one of a moving object, a face, and a human body is included in an image-capturing scene.

6. The photoelectric conversion apparatus according to claim 3, wherein the predetermined event is that one of a moving object, a face, and a human body is included in an image-capturing scene.

7. A photoelectric conversion apparatus comprising:
a plurality of photoelectric conversion units arranged in columns and rows and each configured to generate an electrical charge;
a plurality of digital signal generation units arranged in columns and rows and each configured to generate a digital signal based on the electrical charge; and
a control unit,
wherein the plurality of digital signal generation units generates a first digital signal during a first period,
wherein whether an object that is one of a moving object, a face, and a human body is included in an image-capturing scene is determined based on the first digital signal, and the control unit controls the plurality of digital signal generation units to generate a second digital signal in a second period longer than the first period in a case where a result of the determination indicates that the object is included in the image-capturing scene.

8. A photoelectric conversion apparatus comprising:
a plurality of photoelectric conversion units arranged in columns and rows and each configured to generate an electrical charge;
a plurality of digital signal generation units arranged in columns and rows and each configured to generate a digital signal based on the electrical charge; and
a control unit,
wherein the control unit controls the plurality of digital signal generation units to generate a first digital signal during a first period in a case where an object that is one of a moving object, a face, and a human body is not included in an image-capturing scene, and
wherein the control unit controls the plurality of digital signal generation units to generate a second digital signal in a second period longer than the first period in a case where the is included in the image-capturing scene.

9. The photoelectric conversion apparatus according to claim 4, wherein an edge of a subject is detected using the first digital signal.

10. The photoelectric conversion apparatus according to claim 5, wherein an edge of a subject is detected using the first digital signal.

11. The photoelectric conversion apparatus according to claim 6, wherein an edge of a subject is detected using the first digital signal.

12. The photoelectric conversion apparatus according to claim 7, wherein an edge of a subject is detected using the first digital signal.

13. The photoelectric conversion apparatus according to claim 8, wherein an edge of a subject is detected using the first digital signal.

14. The photoelectric conversion apparatus according to claim 1, wherein a charge amount corresponding to one bit of the first digital signal and a charge amount corresponding to one bit of the second digital signal are different from each other.

15. The photoelectric conversion apparatus according to claim 2, wherein a charge amount corresponding to one bit of the first digital signal and a charge amount corresponding to one bit of the second digital signal are different from each other.

16. The photoelectric conversion apparatus according to claim 3, wherein a charge amount corresponding to one bit of the first digital signal and a charge amount corresponding to one bit of the second digital signal are different from each other.

17. The photoelectric conversion apparatus according to claim 7, wherein a charge amount corresponding to one bit of the first digital signal and a charge amount corresponding to one bit of the second digital signal are different from each other.

18. The photoelectric conversion apparatus according to claim 8, wherein a charge amount corresponding to one bit of the first digital signal and a charge amount corresponding to one bit of the second digital signal are different from each other.

19. The photoelectric conversion apparatus according to claim 14, further comprising:
    a counter configured to generate a count value,
    wherein a range of the count value in the first period is smaller than a range of the count value in the second period.

20. The photoelectric conversion apparatus according to claim 15, further comprising:
    a counter configured to generate a count value,
    wherein a range of the count value in the first period is smaller than a range of the count value in the second period.

21. The photoelectric conversion apparatus according to claim 16, further comprising:
    a counter configured to generate a count value,
    wherein a range of the count value in the first period is smaller than a range of the count value in the second period.

22. The photoelectric conversion apparatus according to claim 17, further comprising:
    a counter configured to generate a count value,
    wherein a range of the count value in the first period is smaller than a range of the count value in the second period.

23. The photoelectric conversion apparatus according to claim 18, further comprising:
    a counter configured to generate a count value,
    wherein a range of the count value in the first period is smaller than a range of the count value in the second period.

24. The photoelectric conversion apparatus according to claim 19, wherein the control unit changes a signal amount based on the electrical charge and corresponding to one bit of each of the first digital signal and the second digital signal by changing a speed of an operation to generate the count value.

25. The photoelectric conversion apparatus according to claim 19,
    wherein the counter generates the count value using a clock signal input to the counter, and
    wherein a speed of an operation to generate the count value is changed by changing a frequency of the clock signal.

26. The photoelectric conversion apparatus according to claim 1, wherein a bit number of the first digital signal is 1.

27. The photoelectric conversion apparatus according to claim 1, further comprising:
    a comparator configured to compare a reference signal and a signal based on the electrical charge,
    wherein the comparator compares the reference signal and the signal based on the electrical charge in each of the first period and the second period.

28. The photoelectric conversion apparatus according to claim 2, further comprising:
    a comparator configured to compare a reference signal and a signal based on the electrical charge,
    wherein the comparator compares the reference signal and the signal based on the electrical charge in each of the first period and the second period.

29. The photoelectric conversion apparatus according to claim 3, further comprising:
    a comparator configured to compare a reference signal and a signal based on the electrical charge,
    wherein the comparator compares the reference signal and the signal based on the electrical charge in each of the first period and the second period.

30. The photoelectric conversion apparatus according to claim 7, further comprising:
    a comparator configured to compare a reference signal and a signal based on the electrical charge,
    wherein the comparator compares the reference signal and the signal based on the electrical charge in each of the first period and the second period.

31. The photoelectric conversion apparatus according to claim 8, further comprising:
    a comparator configured to compare a reference signal and a signal based on the electrical charge,
    wherein the comparator compares the reference signal and the signal based on the electrical charge in each of the first period and the second period.

32. A photoelectric conversion apparatus comprising:
    a plurality of photoelectric conversion units arranged in columns and rows and each configured to generate an electrical charge;
    a plurality of digital signal output units arranged in columns and rows and each configured to output a digital signal based on the electrical charge; and
    a control unit,
    wherein the plurality of digital signal output units outputs a first digital signal during a first period in a case where a predetermined event does not occur, and
    wherein the control unit controls the plurality of digital signal output units to output a second digital signal in a second period longer than the first period in a case where the predetermined event occurs.

33. A photoelectric conversion apparatus comprising:
    a plurality of photoelectric conversion units arranged in columns and rows and each configured to generate an electrical charge;
    a plurality of digital signal output units arranged in columns and rows and each configured to output a digital signal based on the electrical charge; and
    a control unit,
    wherein the plurality of digital signal output units outputs a first digital signal during a first period in a case where a predetermined event is not detected, and wherein the control unit controls the plurality of digital signal output units to output a second digital signal in a second period longer than the first period in a case where the predetermined event is detected.

34. A photoelectric conversion apparatus comprising:
a plurality of photoelectric conversion units arranged in columns and rows and each configured to generate an electrical charge;
a plurality of digital signal output units arranged in columns and rows and each configured to output a digital signal based on the electrical charge; and
a control unit,
wherein the plurality of digital signal output units outputs a first digital signal during a first period,
wherein whether a predetermined event occurs is determined based on the first digital signal, and the control unit controls the plurality of digital signal output units to output a second digital signal in a second period longer than the first period in a case where the predetermined event is detected as a result of the determination.

35. The photoelectric conversion apparatus according to claim 32, wherein the predetermined event is that one of a moving object, a face, and a human body is included in an image-capturing scene.

36. The photoelectric conversion apparatus according to claim 33, wherein the predetermined event is that one of a moving object, a face, and a human body is included in an image-capturing scene.

37. The photoelectric conversion apparatus according to claim 34, wherein the predetermined event is that one of a moving object, a face, and a human body is included in an image-capturing scene.

38. A photoelectric conversion apparatus comprising:
a plurality of photoelectric conversion units arranged in columns and rows and each configured to generate an electrical charge;
a plurality of digital signal output units arranged in columns and rows and each configured to output a digital signal based on the electrical charge; and
a control unit,
wherein the plurality of digital signal output units outputs a first digital signal during a first period,
wherein whether an object that is one of a moving object, a face, and a human body is included in an image-capturing scene is determined based on the first digital signal, and the control unit controls the plurality of digital signal output units to output a second digital signal in a second period longer than the first period in a case where a result of the determination indicates that the object is included in the image-capturing scene.

39. A photoelectric conversion apparatus comprising:
a plurality of photoelectric conversion units arranged in columns and rows and each configured to generate an electrical charge;
a plurality of digital signal output units arranged in columns and rows and each configured to output a digital signal based on the electrical charge; and
a control unit,
wherein the control unit controls the plurality of digital signal output units to output a first digital signal during a first period in a case where an object that is one of a moving object, a face, and a human body is not included in an image-capturing scene, and
wherein the control unit controls the plurality of digital signal output units to output a second digital signal in a second period longer than the first period in a case where the is included in the image-capturing scene.

40. The photoelectric conversion apparatus according to claim 32, wherein a bit number of the first digital signal is 1.

41. The photoelectric conversion apparatus according to claim 32, wherein an edge of a subject is detected using the first digital signal.

42. The photoelectric conversion apparatus according to claim 1,
wherein the plurality of photoelectric conversion units is arranged in a pixel array, and
wherein the plurality of digital signal generation units is arranged within the pixel array in planar view.

43. The photoelectric conversion apparatus according to claim 2,
wherein the plurality of photoelectric conversion units is arranged in a pixel array, and
wherein the plurality of digital signal generation units is arranged within the pixel array in planar view.

44. The photoelectric conversion apparatus according to claim 3,
wherein the plurality of photoelectric conversion units is arranged in a pixel array, and
wherein the plurality of digital signal generation units is arranged within the pixel array in planar view.

45. The photoelectric conversion apparatus according to claim 7,
wherein the plurality of photoelectric conversion units is arranged in a pixel array, and
wherein the plurality of digital signal generation units is arranged within the pixel array in planar view.

46. The photoelectric conversion apparatus according to claim 8,
wherein the plurality of photoelectric conversion units is arranged in a pixel array, and
wherein the plurality of digital signal generation units is arranged within the pixel array in planar view.

47. The photoelectric conversion apparatus according to claim 32,
wherein the plurality of photoelectric conversion units is arranged in a pixel array, and
wherein the plurality of digital signal generation units is arranged within the pixel array in planar view.

48. The photoelectric conversion apparatus according to claim 33,
wherein the plurality of photoelectric conversion units is arranged in a pixel array, and
wherein the plurality of digital signal generation units is arranged within the pixel array in planar view.

49. The photoelectric conversion apparatus according to claim 34,
wherein the plurality of photoelectric conversion units is arranged in a pixel array, and
wherein the plurality of digital signal generation units is arranged within the pixel array in planar view.

50. The photoelectric conversion apparatus according to claim 38,
wherein the plurality of photoelectric conversion units is arranged in a pixel array, and
wherein the plurality of digital signal generation units is arranged within the pixel array in planar view.

51. The photoelectric conversion apparatus according to claim 39,
wherein the plurality of photoelectric conversion units is arranged in a pixel array, and wherein the plurality of digital signal generation units is arranged within the pixel array in planar view.

52. An imaging system comprising:
the photoelectric conversion apparatus according to claim 1; and
a video signal processing unit configured to process a signal output from the photoelectric conversion apparatus and generate image data.

53. An imaging system comprising:
the photoelectric conversion apparatus according to claim 2; and
a video signal processing unit configured to process a signal output from the photoelectric conversion apparatus and generate image data.

54. An imaging system comprising:
the photoelectric conversion apparatus according to claim 3; and
a video signal processing unit configured to process a signal output from the photoelectric conversion apparatus and generate image data.

55. An imaging system comprising:
the photoelectric conversion apparatus according to claim 7; and
a video signal processing unit configured to process a signal output from the photoelectric conversion apparatus and generate image data.

56. An imaging system comprising:
the photoelectric conversion apparatus according to claim 8; and
a video signal processing unit configured to process a signal output from the photoelectric conversion apparatus and generate image data.

57. An imaging system comprising:
the photoelectric conversion apparatus according to claim 32; and
a video signal processing unit configured to process a signal output from the photoelectric conversion apparatus and generate image data.

58. An imaging system comprising:
the photoelectric conversion apparatus according to claim 33; and
a video signal processing unit configured to process a signal output from the photoelectric conversion apparatus and generate image data.

59. An imaging system comprising:
the photoelectric conversion apparatus according to claim 34; and
a video signal processing unit configured to process a signal output from the photoelectric conversion apparatus and generate image data.

60. An imaging system comprising:
the photoelectric conversion apparatus according to claim 38; and
a video signal processing unit configured to process a signal output from the photoelectric conversion apparatus and generate image data.

61. An imaging system comprising:
the photoelectric conversion apparatus according to claim 39; and
a video signal processing unit configured to process a signal output from the photoelectric conversion apparatus and generate image data.

62. An imaging system comprising:
the photoelectric conversion apparatus according to claim 3;
a video signal processing unit configured to process a signal output from the photoelectric conversion apparatus and generate image data; and
a detection unit configured to perform the determination.

63. An imaging system comprising:
the photoelectric conversion apparatus according to claim 7;
a video signal processing unit configured to process a signal output from the photoelectric conversion apparatus and generate image data; and
a detection unit configured to perform the determination.

64. An imaging system comprising:
the photoelectric conversion apparatus according to claim 34;
a video signal processing unit configured to process a signal output from the photoelectric conversion apparatus and generate image data; and
a detection unit configured to perform the determination.

65. An imaging system comprising:
the photoelectric conversion apparatus according to claim 38;
a video signal processing unit configured to process a signal output from the photoelectric conversion apparatus and generate image data; and
a detection unit configured to perform the determination.

* * * * *